US006839687B1

(12) United States Patent
Dent et al.

(10) Patent No.: US 6,839,687 B1
(45) Date of Patent: Jan. 4, 2005

(54) CONSUMER-BASED SYSTEM AND METHOD FOR MANAGING AND PAYING ELECTRONIC BILLING STATEMENTS

(75) Inventors: Warren T. Dent, Redmond, WA (US); Judy Kaethler, Redmond, WA (US); Darren B. Remington, Issaquah, WA (US); Bassam Saliba, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/460,256

(22) Filed: Dec. 13, 1999

Related U.S. Application Data

(62) Division of application No. 08/926,156, filed on Sep. 9, 1997, now Pat. No. 6,128,603.

(51) Int. Cl.[7] .............................................. G06F 17/60
(52) U.S. Cl. ............................. 705/40; 705/33; 705/42; 705/70; 902/24; 708/106
(58) Field of Search .............................. 705/34, 40, 42, 705/33; 235/379

(56) References Cited

U.S. PATENT DOCUMENTS

| | | | |
|---|---|---|---|
| 3,842,248 A | 10/1974 | Yarnell et al. | 235/156 |
| 3,852,571 A | 12/1974 | Hall et al. | 235/61.7 B |
| 4,485,300 A | 11/1984 | Pierce | 235/380 |
| 4,701,601 A | 10/1987 | Francini et al. | 235/449 |
| 4,734,564 A | 3/1988 | Boston et al. | 235/380 |
| 4,799,156 A | 1/1989 | Shavit et al. | 364/401 |
| 4,823,264 A | 4/1989 | Deming | 364/408 |

(List continued on next page.)

FOREIGN PATENT DOCUMENTS

| | | |
|---|---|---|
| EP | 0 745 947 A2 | 5/1996 |
| WO | WO 91/16691 | 4/1991 |
| WO | WO 93/08545 | 10/1992 |
| WO | WO 96/08783 | 9/1995 |
| WO | WO 97/24680 | 7/1997 |

OTHER PUBLICATIONS

Brown, Bob; "TI, SW Bell Unite in EDI Billing Trial," The American City, Aug., 1963.
Vandengel, Gerry; "Cards on the Internet—Advertising on a $3 Bill," World Card Technology, Feb., 1995, pp. 46–48.
"A Different Drummer on the Data Highway," American Banker, May 12, 1995, 2 pages.

(List continued on next page.)

Primary Examiner—Richard Weisberger
(74) Attorney, Agent, or Firm—Lee & Hayes, PLLC

(57) ABSTRACT

A consumer-based bill management and payment system is configured to receive, analyze, manage and pay electronic billing statements received from the biller over the Internet. The system includes a notification manager that detects when the electronic bill arrives and notifies the consumer. The bill is stored in memory with other unpaid electronic bills. According to another aspect of the invention, the system has a cashflow analyzer that enables the consumer to coordinate the unpaid electronic bills according to different payment schedules for a bill payment cycle (e.g., a month). The goal of the manipulation is to permit the consumer to analyze how the different payment schedules affect the consumer's cashflow with an aim toward minimizing overdraft during the bill payment cycle. The cashflow analyzer can automatically compute an optimized payment schedule that minimizes overdraft of the consumer's account, while maximizing the balance to generate the most interest. When the consumer desires to pay a particular bill, the bill is presented to the consumer through a graphical user interface (UI). The bill management and payment system supports a payment analyzer to enable the consumer to determine how much of the electronic bill to pay. The payment analyzer provides a venue to challenge certain items on the bill.

6 Claims, 9 Drawing Sheets

U.S. PATENT DOCUMENTS

| | | | |
|---|---|---|---|
| 4,839,504 A | 6/1989 | Nakano | 235/379 |
| 4,893,248 A | 1/1990 | Pitts et al. | 364/464.01 |
| 4,905,826 A | 3/1990 | Martin | 206/286 |
| 4,949,272 A | 8/1990 | Vanourek et al. | 364/464.02 |
| 4,979,207 A | 12/1990 | Baum et al. | 379/112 |
| 4,992,940 A | 2/1991 | Dworkin | 364/401 |
| 5,027,388 A | 6/1991 | Bradshaw et al. | 379/112 |
| 5,121,945 A | 6/1992 | Thomson et al. | 283/58 |
| 5,197,094 A | 3/1993 | Tillery et al. | 379/91 |
| 5,206,488 A | 4/1993 | Teicher | 235/380 |
| 5,220,501 A | 6/1993 | Lawlor et al. | 364/408 |
| 5,223,699 A | 6/1993 | Flynn et al. | 235/380 |
| 5,229,584 A | 7/1993 | Erickson | 235/375 |
| 5,265,033 A | 11/1993 | Vajk et al. | 364/514 |
| 5,283,829 A | 2/1994 | Anderson | 380/24 |
| 5,287,270 A | 2/1994 | Hardy et al. | 364/408 |
| 5,325,290 A | 6/1994 | Cauffman et al. | 364/401 |
| 5,326,959 A | 7/1994 | Perazza | 235/379 |
| 5,383,113 A | 1/1995 | Kight et al. | 364/401 |
| 5,402,336 A | 3/1995 | Spiegelhoff et al. | 364/401 |
| 5,420,405 A | 5/1995 | Chasek | 235/379 |
| 5,424,938 A | 6/1995 | Wagner et al. | 364/408 |
| 5,465,206 A | 11/1995 | Hilt et al. | 364/406 |
| 5,473,143 A | 12/1995 | Vak et al. | 235/380 |
| 5,477,038 A | 12/1995 | Levine et al. | 235/380 |
| 5,483,445 A | 1/1996 | Pickering | 364/406 |
| 5,508,817 A | 4/1996 | Kunigami | 358/402 |
| 5,532,920 A | 7/1996 | Hartrick et al. | 364/419.1 |
| 5,557,518 A | 9/1996 | Rosen | 364/408 |
| 5,570,465 A | 10/1996 | Tsakanikas | 395/114 |
| 5,590,197 A | 12/1996 | Chen et al. | 380/24 |
| 5,638,522 A * | 6/1997 | Dunsmuir et al. | 395/326 |
| 5,644,727 A | 7/1997 | Atkins | 395/240 |
| 5,649,117 A | 7/1997 | Landry | 395/240 |
| 5,652,786 A | 7/1997 | Rogers | 379/91.01 |
| 5,655,089 A | 8/1997 | Bucci | 395/240 |
| 5,684,965 A * | 11/1997 | Pickering | 235/379 |
| 5,699,528 A | 12/1997 | Hogan | 395/240 |
| 5,832,460 A | 11/1998 | Bednar et al. | 705/27 |
| 5,848,400 A | 12/1998 | Chang | 705/35 |
| 5,884,284 A | 3/1999 | Peters et al. | 705/30 |
| 5,884,288 A | 3/1999 | Chang et al. | 705/40 |
| 5,903,881 A | 5/1999 | Schrader | 705/42 |

OTHER PUBLICATIONS

Meredith, Robin; "Internet Bank Moves Closer to Virtual Reality," USA Today, May 5, 1995.

Strassel, Kim A.; "Dutch Software Concern Experiments With Electronic 'Cash' in Cyberspace," The Wall Street Journal, Apr. 17, 1995.

Rosen, Nick; "Cash Just Isn't Flexible Enough," Daily Express, Feb. 10, 1995.

Piskora, Beth; "Debit Cards Seen Poised for New Markets," American Banker, Mar. 7, 1995.

Bank, David; "Cash, Check, Charge—What's Next?," Seattle Times, Mar. 6, 1995, 4 pages.

Cortese, Amy; "Cyberspace—Crafting software that will let you build a business out there," Business Week, Feb. 27, 1995, 7 pages.

Sirbu, Marvin and Tygar, J. D.; "NetBill: An Internet Commerce System Optimized for Network Delivered Services," Engineering and Public Policy Dept. and Computer Science Dept., Carnegie Mellon University, Pittsburg, Pennsylvania, Feb. 27, 1995, pp. 1–12.

Kutler, Jeffrey; "Cash Card Creator Looking Beyond Mondex," Feb. 9,1995.

Post, David; "E–Cash: Can't Live With It, Can't Live Without It," The American Lawyer, Mar. 1995, pp. 116–117.

Gullo, Karen; "Electronic Bill Payment," American Banker, Jan. 27, 1992.

"Managing Utility Billing," Jul./Aug. 1979, 5 pages.

Myers, Edith; "Banking on PCs," Datamation, 6 pages.

Gullo, Karen; "Citicorp Device is Called Pivotal for Home Banking," American Banker, Mar. 1, 1990.

"Newsnet Reference Guide 1994," Newsnet Inc., 945 Haverford Road, Bryn Mawr, PA 19010.

Palmer, James A. and Gaj, Steven J.; "Consolidated Third Party Collections," Dept. of Veterans Affairs Medical Center, Brecksville, Ohio, Mumps Computing, Jun. 1997, pp. 12–16.

Briere, Daniel and Chris Finn; "Footing the Bill," Network World, v9n21, May 25, 1992.

White, George C.; "Consumer Bill Payment—'Front End' Overview," White Papers, Inc., Apr. 22, 1992, 3 pages.

Pence, Daniel M.; "TV Answer," Electronic Payment Products, TV Answer, Inc., Reston, Virginia, 9 pages.

"New Technologies in Consumer Bill Payment," Scanfone by US Order, 9 pages.

Mila, Paul J., Director of Operations; "Online Resources," McLean, Virginia, 4 pages.

Pope, Dennis, J., Asst. Vice President, EFT Project Manager, Manufacturers Hanover Trust Company, New York, New York, 5 pages.

White, George C.; "Bill Payment Initiation From Retail Stores," White Papers, Inc., Apr. 22, 1992, 2 pages.

"System and Method for Paying Bills Electronically," 7 pages.

Manelski, Dr. Dennis; "Bill & Pay Minitel–Consumer Bill Payments Overview," Minital USA, 880 $7^{th}$ Ave., New York, NY, Apr. 22, 1992.

"More Diversity; Information Services Stress Partnerships," Communication Daily,v12n124, p. 2, Jun. 26, 1992, 2 pages.

"Account Acquisitions," A/S/M Communications, Inc., ADWEEK, May 3, 1993.

Youngblood, Dick, Staff Writer, "Some hung up about paying bills via computer," Star Tribune, Minneapolis, MN, May 23, 1993, 3 pages.

Alexander, Steve, "Community Link to shift its marketing focus from masses to special interest," UMI Inc., Aug. 13, 1993, 3 pages.

Oslund, John J., Staff Writer; "Ready to Score—Big Game Offers US West a Chance to Show Off New Information Service," Star Tribune, Jan. 24, 1992, 3 pages.

"Sprint Considers Single Bill," Communications Week, Dec. 24, 1990, p. 27.

Pfitsinger, William H.; "Consolidate Your Utility Bills . . . ," The American City, Aug. 1963, pp. 80–81.

"A Player Goes After Big Bucks in Cyberspace," American Banker, May 5, 1998.

Orr, Bill; "Electronic Bill Paying Shows Signs of Soaring," ABA Banking Journal, May 1997, 5 pages.

"Universal data access reference and software development kit for Microsoft Windows and Windows NT operating systems"; Microsoft OLE DB 2.0 Programmer's Reference and Data Access SDK; pp. 1–1088; 1988 Microsoft Corporation.

* cited by examiner

Fig. 9

CONSUMER-BASED SYSTEM AND METHOD FOR MANAGING AND PAYING ELECTRONIC BILLING STATEMENTS

RELATED APPLICATIONS

This is a divisional of U.S. patent application Ser. No. 08/926,156, filed Sep. 9, 1997, which is now U.S. Pat. No. 6,128,603.

TECHNICAL FIELD

This invention relates to electronic billing systems. More particularly, this invention relates to systems and methods implemented at a consumer to receive, analyze, and pay electronic billing statements.

BACKGROUND OF THE INVENTION

Essentially everyone is familiar with receiving bills. Every month, like clockwork, millions of consumers and businesses receive bills for goods and services. For convenience, the term "consumer" is used throughout this document to represent both a typical person who consumes goods and services as well as a business that consumes goods and services.

At the end of each billing cycle, a biller generates a bill or statement for each consumer account having a positive or negative account balance, or having transactions that yielded a zero balance. As used herein, a "biller" is any party that originates billing statements for goods or services rendered to the consumer. Examples of billers are utilities, government, merchants, and intermediate billing services such as banks.

The biller also creates remittance information that associates the consumer account with the bill and any payment toward the bill. The remittance information is typically in the form of a detachable stub or coupon that the consumer detaches from the billing statement and returns along with the payment.

The consumer typically pays bills in one sitting, once or twice a month. Until the bill paying time, the consumer collects the bills in one location, a bill "safe-keeping" location. This is a bit inconvenient since the consumer must usually keep many pieces of paper for each bill, including the statement, the remittance stub, the return envelop, and so forth. Additionally, in a family setting, there is often one designated bill payer. If a non-bill payer member handles the bills in an unconventional manner, such as not putting it in the bill "safe-keeping" spot, or not saving the appropriate pieces, or failing to inform the bill payer that the bill arrived, there is significant risk of a missed payment, resulting in unnecessary fees.

The behavior patterns of bill payers vary widely. As an example, here is one common scenario. When the bill paying time arrives, the consumer organizes the bills in some order on the kitchen table. The consumer lists the bills on a paper tablet, including their amount and due date, and begins to mentally analyze when payment should be made. The consumer estimates cash inflow from monthly paycheck(s) or other sources, and estimates the cash outflow resulting from the bills. If the outflow exceeds the inflow, the consumer spends additional time trying to determine how much to pay on each bill, when to pay it, and so forth to avoid incurring a negative balance in their checking account. This exercise is tedious, tiresome, and inefficient.

Once the payment plan is finished, the consumer typically pays the bills by check. Depending upon the analysis, the payment may partially or fully satisfy the amount due in the bill. For each bill, the consumer fills out the payment information on the remittance stub (e.g., amount paid, payment date, and account number), encloses the stub and check in an envelope (often, pre-addressed), and mails it back to the biller using the U.S. postal service.

The conventional paper-based billing system has many drawbacks. There are many headaches associated with collecting bills without misplacing them, organizing the bills, figuring out a payment plan, writing the checks, and so forth. In the end, after all the bills have been paid, the checking account often reflects an ending balance (if Murphy's Law holds) that is lower than the estimated balance derived on the paper tablet.

Unfortunately, the headaches turn to migraines if the consumer also finds that he/she has been mistakenly billed and wants to dispute a bill or reduce the amount paid for the bill. Under present practices, if a consumer wishes to dispute part or the entire bill or remove a transaction item from the bill, the consumer must call the billing company and discuss the matter with a representative. In many cases, the consumer is asked to submit a written letter explaining why the bill is inaccurate. This technique is time consuming, inconvenient and frustrating for the consumer, expensive for the biller, and can induce errors if the partial payment submitted by the consumer is not properly matched up with the appropriate items being paid and those items being challenged. Thank goodness bill payment is limited to once or twice a month.

There is a growing popularity and use of personal finance management (PFM) computer software to assist consumers in managing their finances. Examples of PFM software include "Money" from Microsoft Corporation and "Quicken" from Intuit, Inc. The PFM software enables consumers to electronically track their checkbook and other financial endeavors. PFM users receive the paper bills, enter them into their computers, and manage payment of the bills electronically, rather than on a pad of paper.

It would be beneficial to devise a consumer-based system that handles electronic billing statements transmitted directly from the biller and enables the consumer to manage and pay his/her bills electronically. Unfortunately, most of the PFM software focuses primarily on bill payment, with little emphasis on electronic bill management and essentially no innovation in handling electronically distributed billing statements. Many PFM systems still rely on delivery of paper bills through the U.S. mail.

PFM users are often encouraged to join an additional bill payment service. Examples of electronic bill payment service providers include companies like CheckFree Corporation, Intuit Services Corporation, and VISA Interactive. With this service, the consumer can pay bills without writing paper checks. The consumer sends payment instructions to his/her bill payment service provider by computer (i.e., email), or by telephone using an interactive voice response system. For recurring bills, such as a mortgage, the consumer can also arrange so-called "direct debit" payment systems in which routine payment amounts are automatically debited from the consumers bank account and credited to the biller's bank account on agreed transaction dates.

While the PFM systems help alleviate the problems plaguing the traditional paper-based system, there is room for improvement.

The inventors have devised an electronic bill management and payment system that improves upon existing PFM systems and that is further designed to effectively handle incoming electronic billing statements.

SUMMARY OF THE INVENTION

This invention generally concerns an electronic bill presentment and payment remittance system in which electronic bills are delivered to consumers over an electronic network, such as the Internet. The biller designs how a billing statement and payment remittance information will appear to the consumer and electronically transmits the customized statement and remittance information over the Internet to a consumer's computer.

More specifically, this invention concerns a consumer-based system and method for receiving, analyzing, managing and paying the electronic billing statements received from the biller. According to one aspect of the invention, the bill management and payment system (the billing service) has a notification manager that detects when the electronic bill arrives and notifies the consumer. There is a variety of ways to notify the consumer, including displaying a bill arrival notice on the consumer's display, waking-up the computer, launching the personal finance management application (PFM), or having the billing service call or fax the notice. The bill management and payment system stores the bill in memory with other unpaid electronic bills.

According to another aspect of the invention, the system enables the consumer to coordinate the unpaid electronic bills according to different payment schedules for a bill payment cycle (e.g., a month). The goal of the manipulation is to permit the consumer to analyze how the different payment schedules affect the consumer's cashflow with an aim toward minimizing overdraft during the bill payment cycle.

In one implementation, the bill management and payment system supports a cashflow analyzer user interface (UI) that presents a list of icons representing the unpaid electronic bills and a date line showing dates in the bill payment cycle. The cashflow analyzer UI enables a consumer to drag and drop the unpaid bill icons from the list, as well as other cashflow items (e.g., paycheck) onto certain dates of the date line. One option is to have the bills automatically "snap" to the appropriate due date, as an initial placement of the bills on the dates of the payment cycle.

The consumer can then move the unpaid bill icons and cashflow items about in the date line to form different payment schedules for the billing cycle. The cashflow analyzer UI shows the consumer's payment account information and automatically adjusts the account information for each date as the consumer moves the unpaid bill icons and cashflow items to form different payment schedules.

According to another aspect, the cashflow analyzer can automatically compute an optimized payment schedule that minimizes overdraft of the consumer's account, while maximizing the balance to generate the most interest.

When the consumer desires to pay a particular bill, the bill is presented to the consumer through a graphical user interface (UI). The bill appears according to the biller's design. According to another aspect of this invention, the bill management and payment system supports a payment analyzer to enable the consumer to determine how much of the electronic bill to pay. Unlike existing direct debit arrangements, the consumer is in direct control of the amount to be paid and the payment date as well as which account they wish to use to pay the bill (assuming they have more than one account). The consumer specifies the payment date and the dollar amount to be paid. The consumer can make partial or full payment toward the bill balance. The consumer exercises control of the payment remittance process every time a payment is made.

Moreover, the payment analyzer provides a venue to challenge certain items on the bill. In one implementation, the biller provides a line-by-line itemization of the bill, along with predefined dispute reasons that the consumer can check to challenge particular items on the bill. The bill contains by itself, or in conjunction with the payment analyzer, executable code to automatically reduce the amount paid number to reflect any disputed amounts. The UI also permits the consumer to open dialog boxes to more fully explain reasons for disputing a bill, or to change an address, or to submit other types of communication.

BRIEF DESCRIPTION OF THE DRAWINGS

FIG. 9 is the billing statement of FIG. 8, but shown after a consumer has made adjustments for disputed items.

The same reference numbers are used throughout the figures to reference like components and features.

DETAILED DESCRIPTION OF THE PREFERRED EMBODIMENT

Figure 1:
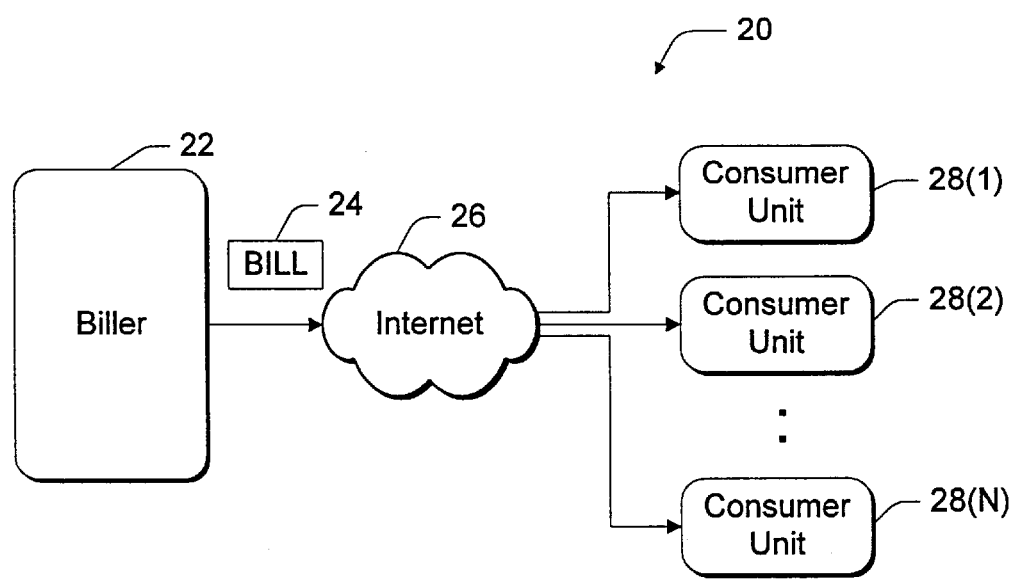
FIG. 1 is a diagrammatic illustration of a bill presentment and payment system.

FIG. 1 shows an electronic bill presentment and payment system 20 in which a biller 22 creates and electronically distributes its billing statements 24 via a service center (not shown) over a network 26, such as the Internet, to multiple consumers 28(1), 28(2), . . . , 28(N). The bill presentment and payment system 20 is an electronic, computerized system having computing units at the biller 22 and consumers 28(1)-28(N). For convenience, the terms "biller" and "biller computing unit" are used interchangeably throughout this disclosure and referenced by the same numbers.

The biller computing unit 22 creates customized bills and payment remittance information in a preferred format. That is, the biller computing unit 22 can design the appearance of the bill, organize how the billing data is presented to the consumer, incorporate advertisements or hyperlinks to other services, and create the overall framework for navigating the bill itself. The bills are packaged in one or more data packets and transmitted over the Internet 26 to the consumers 28(1)-28(N).

The consumers 28(1)-28(N) receive the billing statements electronically from the Internet 26. The consumers 28(1)-28(N) each have a user interface unit to render the electronic bill for viewing. A user interface unit is preferably a computerized device, such as a computer (e.g., personal computer, laptop, handheld computer, etc.) or a web-enabled television, or an Internet-enabled screen phone, which renders the billing statements through a graphical user interface (UI) on a display. For convenience, the terms "consumer" and "consumer interface unit" are used interchangeably throughout this disclosure and referenced by the same numbers.

The consumer can elect to pay the bill electronically. The consumer may return a payment instruction to the biller 22, or a representative of the biller, over the Internet. An entire electronic billing system is described in U.S. patent application Ser. No. 08/734,518, entitled "Electronic Bill Presentment and Payment System", which was filed Oct. 18, 1996 in the names of Darren Remington and Warren Dent, and is assigned to Microsoft Corporation. This application is incorporated by reference.

This invention is directed to aspects implemented at the consumer interface unit. More particularly, aspects of this invention concern systems and methods for receiving, analyzing, managing, and paying the electronic billing statements received from the biller.

Figure 2:
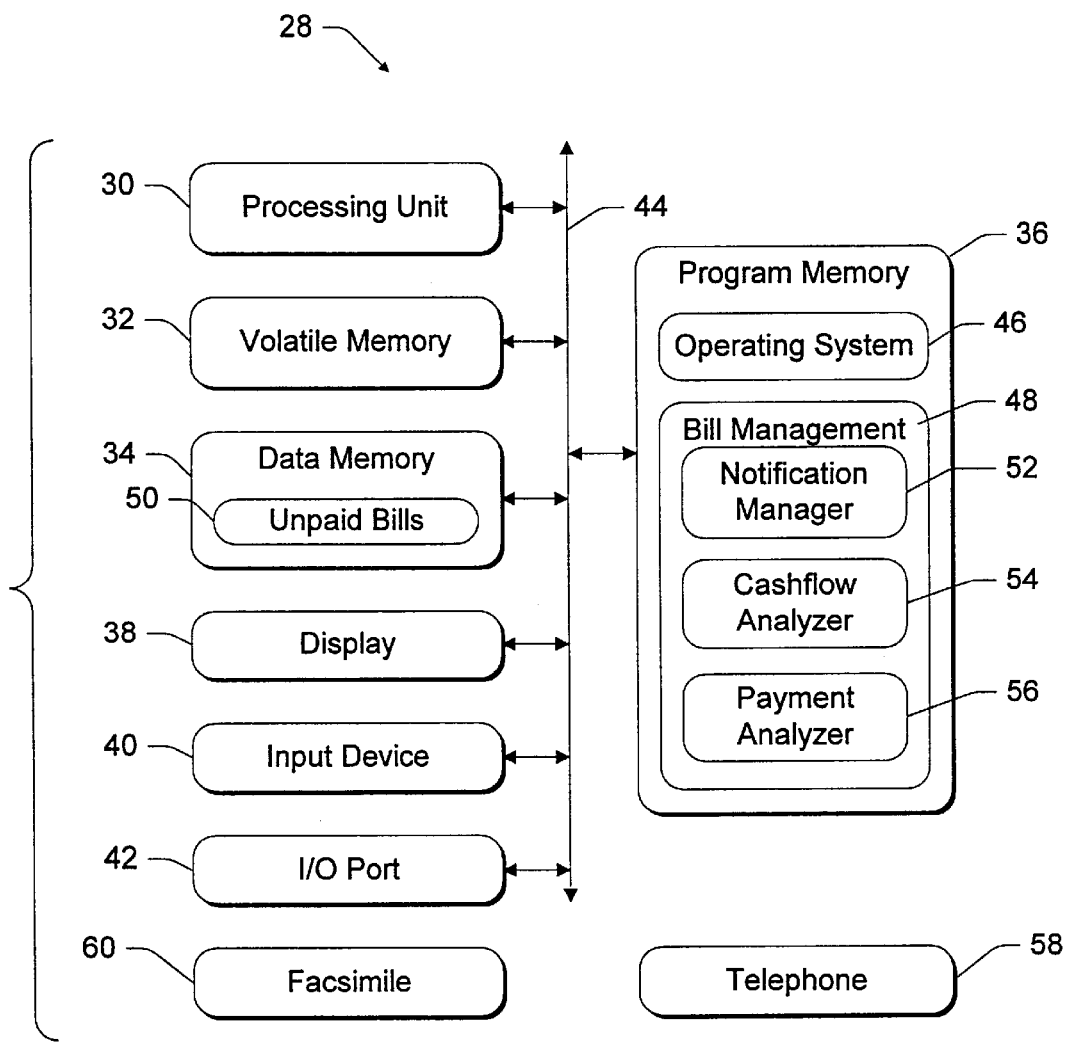
FIG. 2 is a block diagram of a consumer computer that implements the bill management and payment system of FIG. 1.

FIG. 2 shows the consumer user interface unit 28 in more detail. It includes a processing unit 30, a volatile memory 32 (e.g., RAM), a non-volatile data memory 34 (e.g., disk drive, etc.), a non-volatile program memory 36 (e.g., ROM, disk drive, CD-ROM, etc.), a display 38 (e.g., computer monitor, television tube, etc.), an input device 40 (e.g., keyboard, mouse, track ball, stylus, handheld remote control, etc.), and an I/O port 42 (e.g., modem, satellite dish, network card, ISDN connection, etc.). The computer components are interconnected by an electronic interconnect structure 44 that consists of parallel and serial conductors, such as SCSI-, PCI-, and RS 232-compatible conductors. As an example, the biller user interface unit 28 can be implemented as a conventional personal computer (PC) or a web-enabled television or an Internet-enabled screen phone.

The consumer's user interface unit 28 runs an operating system 46 that supports multiple applications. The operating system 46 is stored on the memory 36 and executes on the processing unit 30. The operating system is preferably a multitasking operating system that allows simultaneous execution of multiple applications. The operating system 46 employs a graphical user interface windowing environment that presents the applications or documents in specially delineated areas of the display screen called "windows." Each window has its own adjustable boundaries that enable the bill designer to enlarge or shrink the application or document relative to the display screen. Each window can act independently, including its own menu, toolbar, pointers, and other controls, as if it were a virtual display device. One preferred operating system is a Windows brand operating system sold by Microsoft Corporation, such as Windows 95, Windows NT, Windows CE, or other derivative versions of Windows. However, other operating systems that provide windowing environments may be employed.

A bill management application 48 runs on the operating system 46 to manage the electronic bills. The bill management application 48 can be a separate software component, or integrated with the consumer's personal finance management (PFM) software. The bill management application performs bill handling and management functions, such as receiving the electronic bills from the I/O port 42, storing them in the data memory 34 as unpaid bills 50, presenting the bills to the consumer, enabling payment of the bills, and returning the remittance and payment to the biller (or other receiving party).

The bill management application 48 includes three software modules: a notification manager 52, a cashflow analyzer 54, and a payment analyzer 56. The notification manager 52 notifies a consumer when an electronic bill arrives at the consumer user interface. The cashflow analyzer 54 enables the consumer to manage payment of the electronic bills based upon how payment impacts the consumer's cashflow, such as whether paying the bills will result in an unwanted overdraft condition. The payment analyzer 56 enables the consumer to critically view the bill, assess whether the items are appropriate for payment, and to determine ultimately how much of the electronic bill to pay.

The notification manager 52 can be implemented in several ways to give notice. One technique is to pop-up a notification dialog box on the display 38 when a bill arrives to inform the consumer of the bill's arrival.

Figure 3:
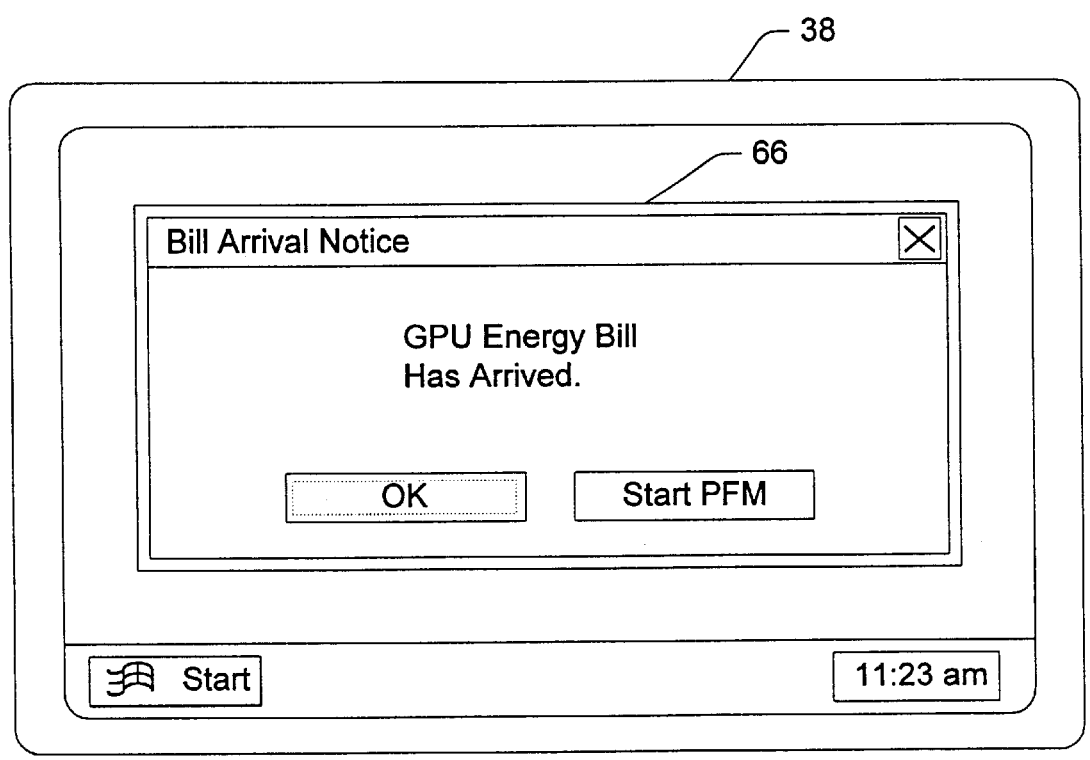
FIG. 3 is an example illustration of a graphical user interface box showing a bill arrival notice.

FIG. 3 shows an example of a notification dialog box 66 that is presented on a display 38 when the bill arrives. The notification box 66 contains a message telling the consumer that a bill has arrived. The notification screen 66 can be configured to pop-up immediately, for example, when the consumer is actively viewing or interacting with the consumer interface unit, or to pop-up when the consumer first turns on the consumer interface unit.

Another notification technique is to wake-up the consumer interface unit. Some computers are now, and many future computers will be, implemented with sophisticated hardware that enables them to wake-up from a dormant power-saving sleep. In such systems, the notification module can be configured to wake-up the computer when a bill is received, store the bill, and provide notice to the consumer that the bill has arrived (such as via the notification box 66 of FIG. 3).

Another notification technique is to have the notification manager 52 launch the PFM application (if present). That is, when a bill arrives, the notification manager 52 sends an instruction requesting that the PFM application be executed. The notification manager 52 can combine this strategy with waking up the consumer interface unit so that upon arrival of a bill, the notification manager restores the active state of the consumer interface unit and launches the PFM application.

The notification manager 52 might also facilitate provision of other forms of notification. For example, the notification manager 52 might provide an option screen that enables the consumer to specify whether they would like to be notified by means other than electronic transmission of the bills. For instance, the bill notification might offer a service to call the consumer via telephone or to send a facsimile to the consumer. In such cases, the notification manager 52 provides an option to be notified by phone or facsimile. Upon selection by the consumer, the notification manager 52 sends a message over the Internet to the biller asking it to send bill notifications via phone or facsimile. In FIG. 2, the consumer is equipped with a telephone 58 and a facsimile machine 60 to receive the bill notices.

When the bill arrives, the consumer may wish to examine the bill initially. The consumer can open the bill and present it on the display 38.

Figure 4:
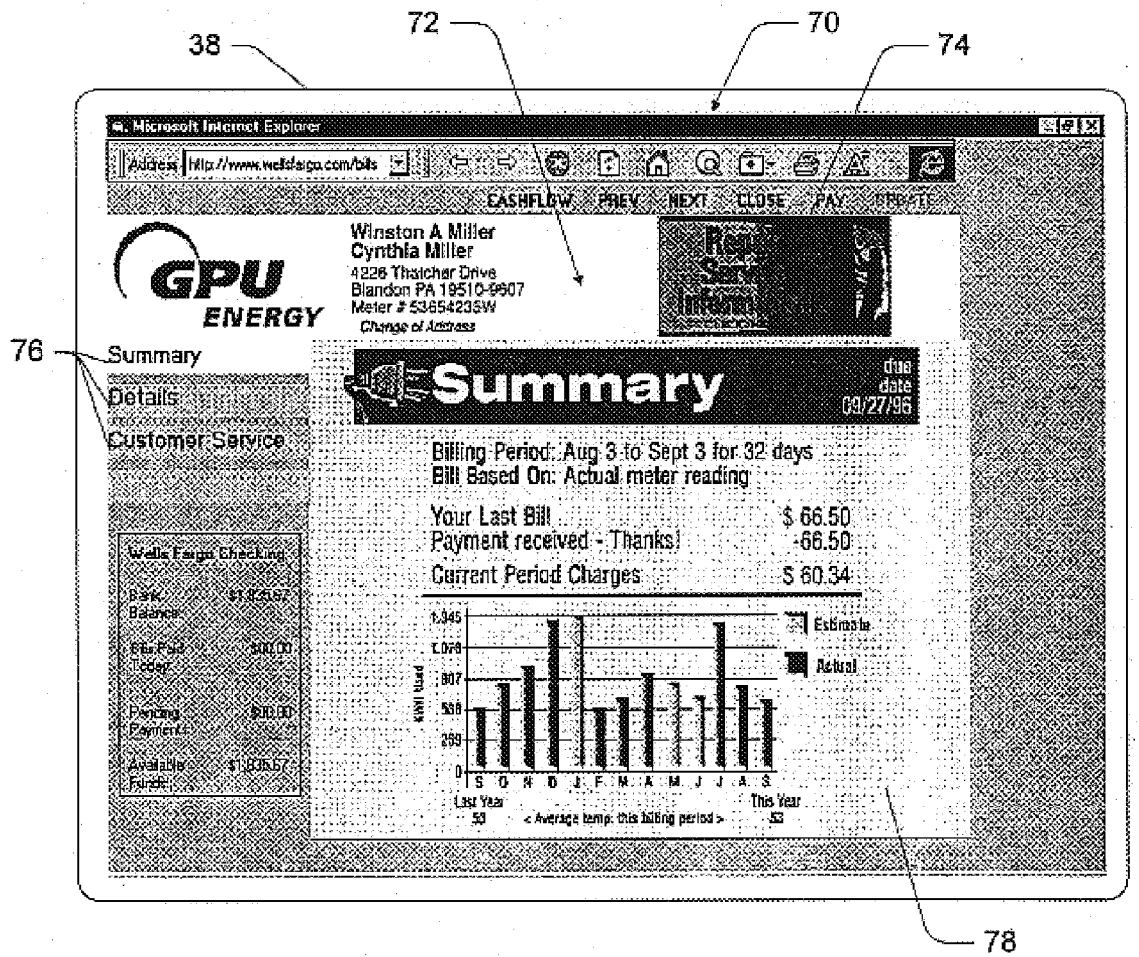
FIG. 4 shows an example illustration of a graphical user interface window containing an electronic billing statement.

FIG. 4 shows an example illustration of a graphical user interface with a billing statement 70 for a company named "GPU Energy" presented on the display 38. In this example, the billing statement 70 is written in a "markup language," such as HTML (Hypertext Markup Language). HTML is a subset of SGML (Standard Generalized Markup Language), a language formally defined as "a language for document representation that formalizes markup and frees it of system and processing dependencies." HTML documents are compatible with the World Wide Web. The HTML billing statement 70 is rendered by an Internet browser application, such as the Internet Explorer browser from Microsoft Corporation, which executes on the consumer's computer.

The billing statement 70 appears as designed by the biller. In this example, the billing statement has a banner stripe 72 across the top to show biller and consumer information. The banner stripe 72 contains a company logo "GPU Energy" and the consumer's name and address. The banner stripe 72 may also contain advertisements, announcements, or other types of information. Here, the bill contains a "Repair Service Information" button 74. If the consumer activates the button 74, the consumer's computer dials a customer services representative over the Internet and the consumer can initiate an online discussion with the representative.

The billing statement 70 has multiple softkeys or buttons 76 that form tabbed navigation points to facilitate quick movement from one section of the bill to another. In this example, there is a "Summary" tab that references the billing page shown in the figure. Activation of a "Details" tab (via a mouse pointer, for example) changes the screen from the summary page to one or more pages itemizing the billing transactions. A "Customer Service" tab switches to a page giving instructions on how to access customer service or providing information on frequently asked questions of customer service departments.

The billing statement 70 has a main body 78 that contains the billing particulars. On the summary page of the GPU Energy bill, the billing particulars in body 78 include an amount due, an amount previously paid, a billing period, and statistics on energy usage. On the "Details" page, the billing information in the body 78 might include line items detailing a purchase date, purchase order number, invoice number, item number, description of item, quantity, price, total, tax, and amount due.

Figure 8:
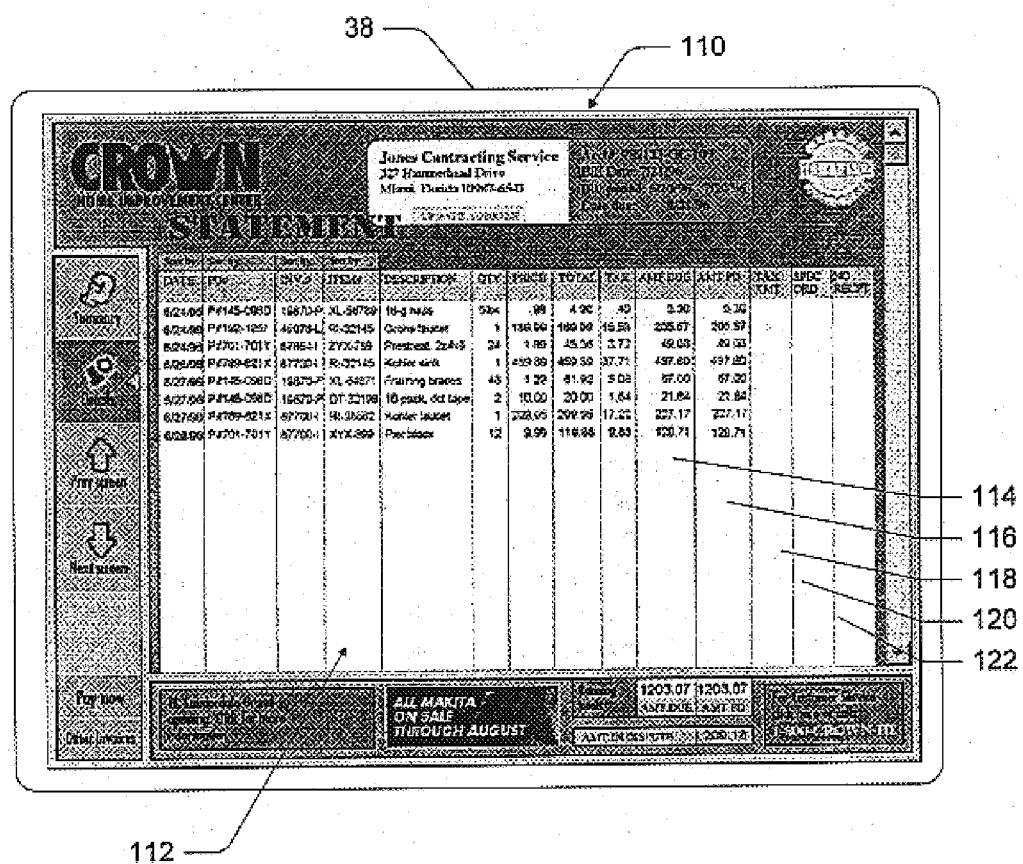
FIG. 8 is an example illustration of a graphical user interface window showing a billing statement for a fictitious company as it arrives at a consumer's computer.
Figure 9:
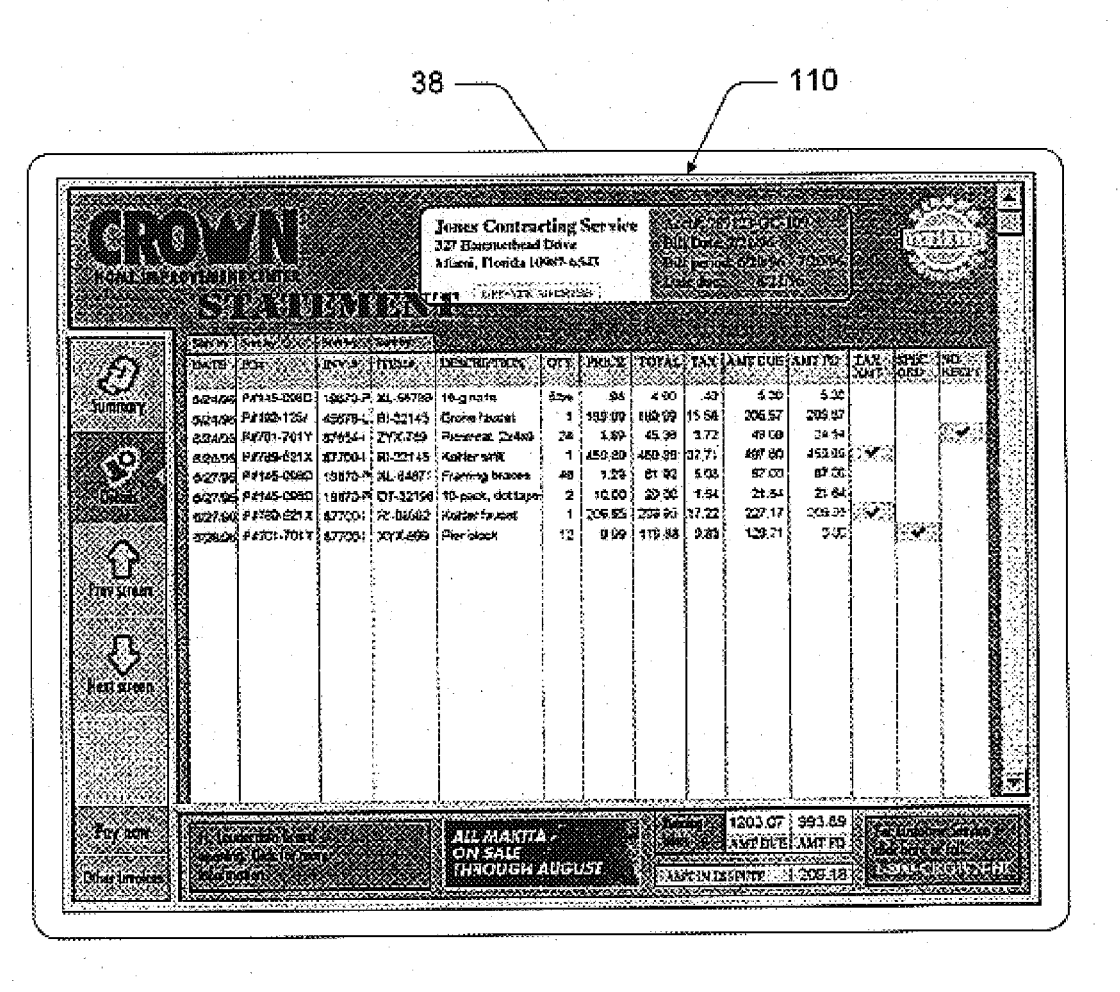

The billing statement in FIG. 4 is merely one example. There are infinitely many ways to organize and present data. Another example of a different bill format is shown in FIGS. 8 and 9, which are described below. In addition, the billing statement may contain other items, such as embedded hyperlinks, executable code, and pop-up dialog boxes, which provide additional design flexibility and customization. The biller can essentially create any aesthetics, organization, and detail that it prefers.

With reference to FIG. 2, the consumer can invoke the cashflow analyzer 54 to assess how paying the bills will impact the consumer's cashflow. The cashflow analyzer 54 collects the unpaid electronic bills 50 received electronically from a biller and enables the consumer to coordinate the unpaid bills according to different possible payment schedules for a bill payment cycle, such as a two week period or a month. In so doing, the consumer can analyze how the different payment schedules affect the consumer's cashflow during the bill payment cycle. In the preferred embodiment, the cashflow analyzer 54 provides a graphical user interface to facilitate the consumer's review of the bill.

Figure 5:
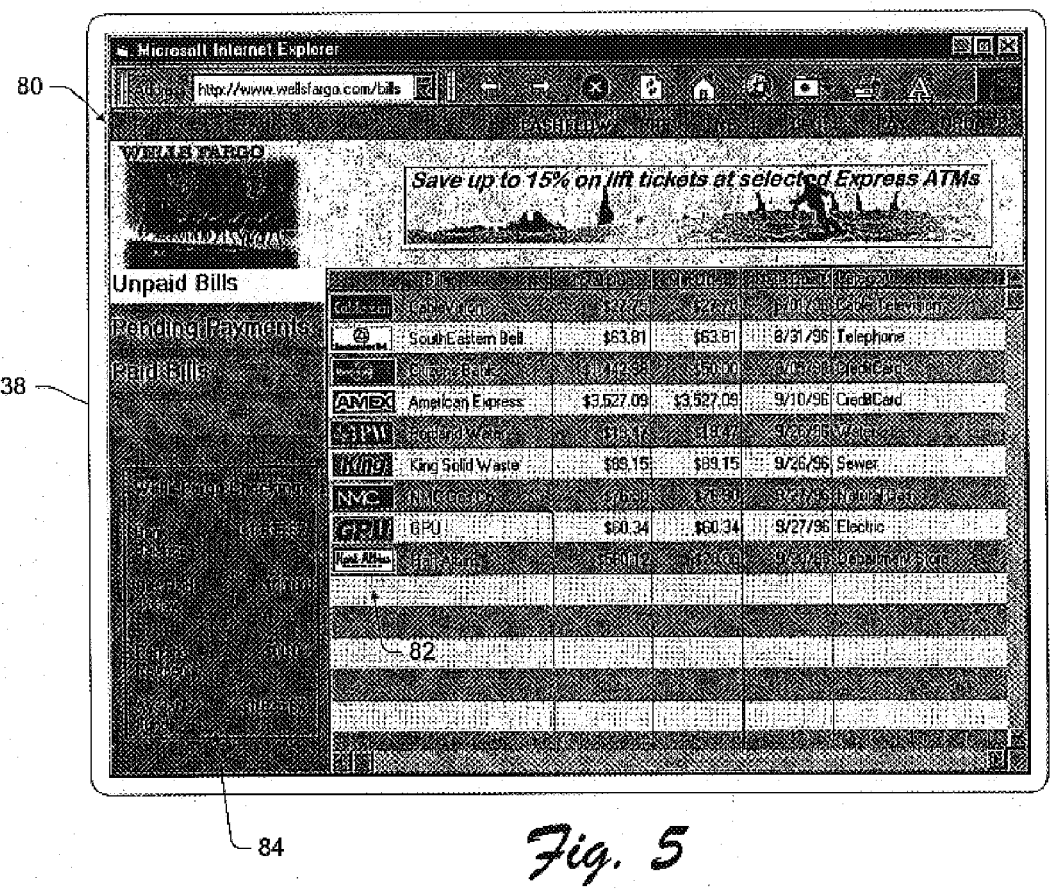
FIG. 5 shows an example illustration of a graphical user interface window containing an icon list of unpaid electronic bills.

FIG. 5 shows an example of a graphical user interface window 80 presented by the cashflow analyzer 54 on display 38. The unpaid bills are represented as graphical icons 82, such as the icons for CableVision, SouthEastern Bell, Citizens Bank, American Express, and so on. The unpaid bill icons 82 are conveniently organized in a list. The unpaid bill list window 80 of the cashflow analyzer UI shows pertinent information regarding the unpaid bills, including the total amount due, minimum payment, due date, and category. The cashflow analyzer UI also provides a summary 84 of the consumer's account (in this case, the consumer's checking account), showing an account balance, any bills that the consumer has paid today, any pending payments, and the remaining available funds to pay bills.

The cashflow analyzer 54 enables the consumer to examine various payment schedules for the unpaid bills. The consumer invokes a second graphical user interface window that presents a date line or calendar showing dates in bill payment cycle.

Figure 6:
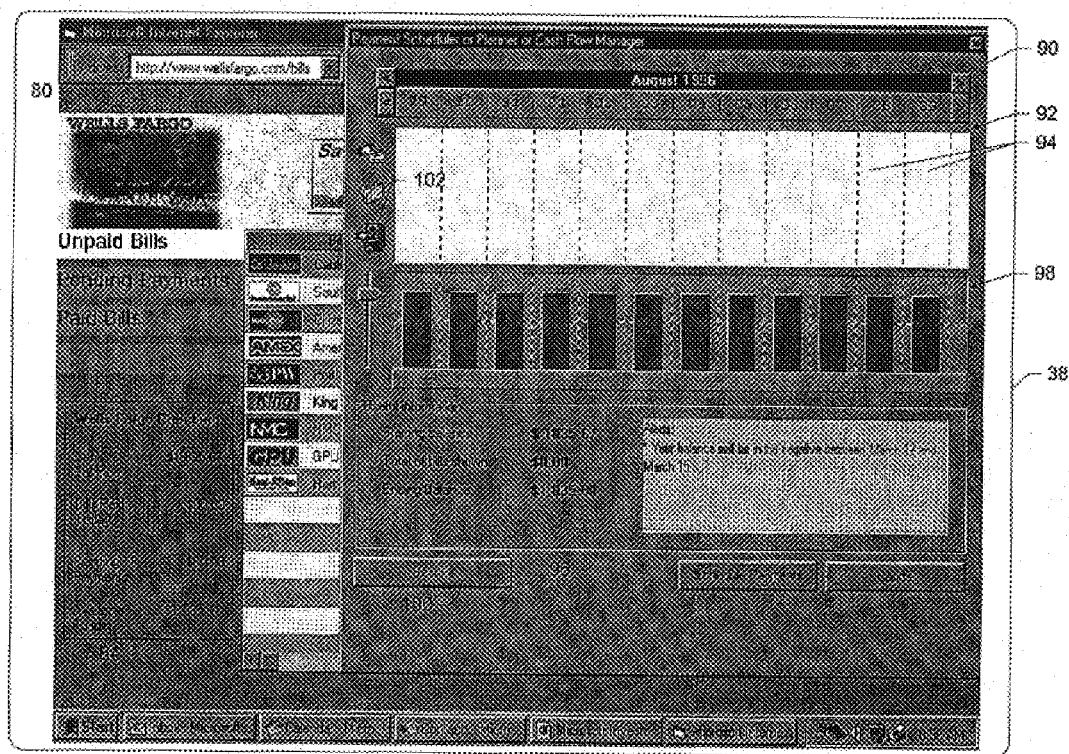
FIG. 6 shows an example illustration of the FIG. 5 window, with an overlaid graphical user interface window containing a data line.

FIG. 6 shows an example of the calendar user interface window 90 presented by the cashflow analyzer 54 on display 38. The calendar UI 90 is shown partially overlaid on the unpaid bill list window 80. The calendar UT 90 shows a date line 92 having a series of dates in a bill payment cycle arranged in a linear bar chart. The dates Jul. 29, 1996 to Aug. 7, 1996 are shown in FIG. 6. Each date has a zone 94 into which the bill icons are moved to propose various payment schedules.

The calendar UI 90 also contains a dynamic summary 96 of the consumer's account that changes as the consumer experiments with different payment schedules. Initially, as shown in FIG. 6, the date zones 94 in the date line 92 are empty. Accordingly, the consumer's account balance in the calendar UI summary 96 reflects the same balance shown in the summary 84 of the unpaid bill list UI 80. The calendar UI 90 also has a bar graph 98, with one bar associated with each date in the date line 92. The bar graph 98 reflects the consumer's account balance at each day within the payment cycle. Initially, the bars in the graph are all at the same height equal to the starting balance.

The calendar UI 90 also has a "Best Fit" button 100, which upon activation is by the consumer instructs the cashflow analyzer 54 to automatically derive an optimum payment schedule for the list of unpaid bills. The cashflow analyzer 54 seeks to minimize overdraft, while maximizing account balances, to thereby maximize the amount of interest earned. This aspect is described below in more detail.

When the consumer desires to experiment with different payment schedules, the consumer drags and drops the unpaid bill icons from the list screen 80 onto certain dates of the date line 92. Additionally, the consumer may drag other cashflow items—such as cash inflow items representing payday, a tax rebate, a bonus, etc. or cash outflow items representing an unexpected car payment, etc.—onto the date line 92. Icons 102, which are arranged beside the date line 92, represent other cashflow items.

The drag and drop aspects are preferably implemented using object linking and embedding (OLE), which is commercially available from Microsoft Corporation under a technology known as "ActiveX." OLE is an extensible service architecture built on the Component Object Model (COM) which is both language independent and location independent. OLE supports an OLE Drag and Drop that is widely used in Windows-compatible operating systems. OLE and COM have been well documented and will not be explained in detail. For more information regarding OLE and COM, refer to *OLE 2 Programmer's Reference* and *Inside OLE 2, Second Edition*, both published by Microsoft Press of Redmond, Wash., and both of which are hereby incorporated by reference.

Alternatively, the consumer can set an option to have the unpaid bills automatically "snap" to their appropriate due date, as an initial placement of the bills on the dates in the date line 92. When this option is set, the bill icons immediately jump to or appear on the appropriate dates.

Figure 7:
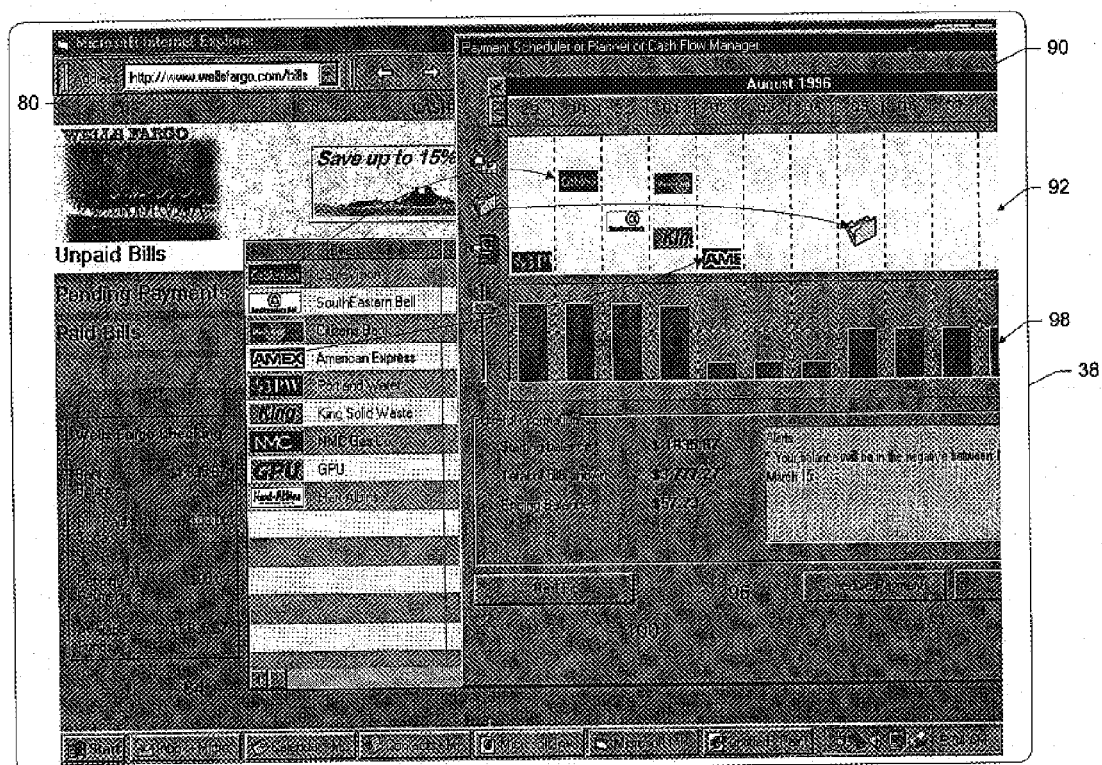
FIG. 7 is similar to FIG. 6, but at a time after some of the bill icons have been dragged onto the date line window.

FIG. 7 shows the overlapping cashflow analyzer windows 80 and 90 of FIG. 6, but after the consumer has placed the unpaid bill icons onto the date zones 94 of the date line 92. In this example, the CableVision bill icon is placed on the July $30^{th}$ date, the American Express bill icon is placed on the August $2^{nd}$ date, and so forth. Additionally, the consumer has dragged a payday icon to the August $5^{th}$ date to reflect a cash inflow event.

By dragging the bill icons to various dates in the payment cycle, the consumer has effectively created a proposed payment schedule. As the consumer is dragging and dropping the icons, the cashflow analyzer 54 automatically computes the impact on cashflow. Namely, the cashflow analyzer automatically adjusts the account information in the summary 96 and the bars in the bar graph 98 to reflect the present schedule. For the bill arrangement shown in FIG. 7, the consumer's bank account reveals that after all the bills are paid and the payday is collected, the balance will be $57.73. Notice that in the interim between paying the bills and receiving a paycheck the consumers account balances actually become negative as indicated by the bars for August $2^{nd}$ to August $4^{th}$. The negative bars can be colored (such as red) to help visually impart the fact that the account is in negative territory.

If the consumer is dissatisfied with the payment schedule, the consumer can simply manipulate one or all of the unpaid bill icons and other cashflow items to try different payment schedules. The consumer can also experiment with partial payment of certain bills to determine how that would impact the cashflow.

The consumer can also activate the "best fit" button 100 to allow the cashflow analyzer to optimize a payment schedule. As one example implementation of this aspect, the cashflow analyzer is programmed to perform the following steps:

Step 1: Set all unpaid bills to their due date. If this payment schedule results in a positive balance, then the cashflow analyzer considers the payment schedule optimized, and the process stops. If this payment schedule results in a negative balance, the process continues to the next step.

Step 2: The cashflow analyzer prompts the consumer to indicate which unpaid bills cannot be late. The cashflow analyzer eliminates these bills from any delay consideration. The remaining bills (referred to as subset A) are eligible for some manipulation.

Step 3: The cashflow analyzer determines a penalty period (e.g., 10 days, 30 days, etc.) that is available for each bill in subset A.

Step 4: The cashflow analyzer determines a penalty cost, if any, on each bill in subset A, assuming they are paid late. This penalty cost is added to the appropriate bill amount due.

Step 5: If a negative balance of some constant deficit amount exists between just one bill due date and the next paycheck deposit date (call this time period "y" days), the cashflow analyzer determines the smallest number of bills, the sum of whose adjusted amounts due just, and least, exceed the deficit amount, and for which the next deposit date fits within the current individual bill due date plus an individual penalty period. If there are no bills that fit this test, the process advances to step 6. If one or more bills comply with this test, the cashflow analyzer moves these bills to the next deposit date and ends the process.

Step 6: For each bill remaining in subset A with a penalty period less than y days, the cashflow analyzer tries moving each bill to the end of its penalty period, computes an interest gained by the delay (via user input or suggested rate), and compares the interest to the penalty cost. If interest gained is greater than the penalty cost, the cashflow analyzer moves the bill to end of the penalty period.

The above procedure could be extended to more complicated cases where the negative balance decreases over several bill due dates before the next payment deposit date (i.e. extension of step 5 beyond one bill causing negative payment account position). Additionally, the cashflow analyzer could determine what a loan for a few days would cost at prevailing rates to cover the negative balance and compare that loan cost to the penalty costs. Other alternative financing options could be suggested to the consumer—such as charging certain bill amounts due to a credit card if the biller permits use of this payment instrument. The cash flow analyzer could be automatically linked to financial advisory services, such as anticipated in future versions of Microsoft Money.

After the consumer has analyzed the unpaid bills and decided on a payment schedule, the consumer can pay specific bills as prescribed by the schedule. When paying a bill, the consumer displays the bill on the display and analyzes the individual bill using the payment analyzer 56 (FIG. 2). One bill format is shown in FIG. 4.

FIG. 8 shows another example of a graphical user interface window containing an electronic billing statement 110 presented by the payment analyzer 56 on display 38. The billing statement is for a fictitious company Crown Home Improvement Center. The bill UI 110 has a main body portion 112 that lists individual line items for each purchase at Crown Home Improvement Center, with each line item containing the purchase date, purchase order number, invoice number, item number, description of item, quantity, price, total, tax, and amount due.

The bill presentment UI 110 provides an easy forum for the consumer to evaluate and challenge certain portions of the bill. It is common that a consumer might want to challenge a line item on the bill. For instance, the bill might include a tax on an item that is used for a non-taxable purpose, or the bill might include an item that has not yet been received by the consumer, or the bill might include an item that the consumer returned.

The bill UI 110 is constructed with appropriate controls that enable a consumer to dispute an item. As an example, the bill UI 110 might contain additional columns which categorize preset reasons for challenging a billing item, such as tax exempt status, or the product has not been received, or the item has been returned, or payment was previously made, and so forth. With this arrangement, the consumer simply places a "mark" in the appropriate column adjacent to the item. Upon insertion of the mark, the bill UI 110 dynamically adjusts the bill to reflect the consumer's challenges. The bill contains both dynamic data, which can be modified by the consumer inputs, and static data that cannot be modified.

It is noted that the electronic bill itself, as received from the biller, might contain the controls to permit line item challenge. For instance, the electronic bill can be written as an HTML document that includes executable code, such as ActiveX or Java components. Alternatively, the controls may be provided by the payment analyzer component to manipulate the data contained in the electronic bill.

FIGS. 8 and 9 show an example of challenging a line item in the billing statement for Crown Home Improvement Center. FIG. 8 shows the billing statement as it originally arrives at the consumer. The billing statement includes an "amount due" column 114 that lists the amount due for each item purchased from Crown (e.g., the quantity purchased times the prices per unit, plus tax) and an "amount paid" column 116 that lists the amount paid for each item. When the bill arrives, the data in the amount paid column 116 is dynamic data, which is initially set equal to the static data found in the amount due column 114.

Next to these columns are three columns of pre-arranged dispute reasons for non-payment or partial payment of an item. The dispute columns include a "tax exempt" column 118 that is checked if the item should not have been taxed, a "special order" column 120 that is checked if the product has been ordered but not yet received, and a "no receipt" column 122 that is checked if the consumer has not yet received the goods. With this bill format, the consumer can examine each purchase, line by line. If the consumer desires to challenge an item, the consumer simply clicks or otherwise selects the appropriate column cell.

FIG. 9 shows the bill UI 110 after the consumer has disputed four of the items. Upon clicking the appropriate cell, the bill UI 110 places a visible "check mark" in the appropriate cell. Where possible, the bill UI 110 automatically adjusts the amount paid column 116 to reflect the disputed amount. For example, when the consumer checks the tax-exempt column 118, the bill UI 110 automatically deducts the tax from the amount paid column 116. In some cases, however, the consumer inputs the corrected amount paid to reflect the disputed amount. In this example, the consumer deducted part of the amount due for one-half of an order in which the consumer has not received the goods.

The bill might also be designed to enable a consumer to open a dialog box in conjunction with a disputed item. The consumer can write a detailed explanation for the challenge in the dialog box. When the consumer finishes and closes the dialog box, the text is saved and included in the remittance information to be returned to the biller.

The ability to check predefined reasons for disputing a particular item of the bill, or to enter an explanation electronically through a dialog box, significantly improves the efficiency of communication between the biller and consumer, and potentially reduces or eliminates wasteful non-electronic communication between them. Additionally, since the disputes are automatically associated with the particular billing item, the process leads to more efficient remittance processes and audit tracking processes.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. For execution on a consumer computer, a cashflow analyzer user interface (UI) executing on the consumer computer to present a list of icons representing unpaid electronic bills received electronically from a biller and a date line showing dates in bill payment cycles, the cashflow analyzer UI enabling a consumer to drag and drop the unpaid bill icons from the list and other cashflow items onto certain dates of the date line and to move the unpaid bill icons and cashflow items about in the date line to form different payment schedules for the billing cycle, the cashflow analyzer UI further presenting the consumer's account information and automatically adjusting the account information in response to the consumer coordinating the unpaid bill icons and cashflow items.

2. A cashflow analyzer user interface as recited in claim 1, further configured to automatically place the unpaid bill icons on pre-specified dates on the date line.

3. A cashflow analyzer user interface as recited in claim 1, further configured to automatically organize the unpaid bill icons on the date line relative to a preset arrangement of the cashflow items to maximize interest or minimize overdraft.

4. In a consumer-based electronic bill analysis system, a method comprising the following steps:

presenting a list of icons representing unpaid electronic bills received electronically from a biller;

presenting a graphical user interface having a date line with dates in a bill payment cycle;

enabling a consumer to drag and drop the unpaid bill icons from the list onto certain dates of the date line to define a payment schedule;

presenting the consumer's account information; and automatically adjusting the consumer's account information during the bill payment cycle as the consumer drops the unpaid bill icons on selected dates to define the payment schedules.

5. A method as recited in claim 4, further comprising the step of automatically placing unpaid bill icons on pre-specified dates on the date line.

6. A method as recited in claim 4, further comprising the step of automatically organizing the unpaid bill icons on the date line to minimize overdraft in the consumer's account.

\* \* \* \* \*